(12) United States Patent
Brooks

(10) Patent No.: US 12,454,935 B2
(45) Date of Patent: Oct. 28, 2025

(54) FLOAT APPARATUS FOR HARNESSING WAVE ENERGY

(71) Applicant: Nathaniel Brooks, Juneau, AK (US)

(72) Inventor: Nathaniel Brooks, Juneau, AK (US)

(*) Notice: Subject to any disclaimer, the term of this patent is extended or adjusted under 35 U.S.C. 154(b) by 0 days.

(21) Appl. No.: 18/754,669

(22) Filed: Jun. 26, 2024

(65) Prior Publication Data

US 2025/0043764 A1    Feb. 6, 2025

Related U.S. Application Data

(60) Provisional application No. 63/511,510, filed on Jul. 31, 2023.

(51) Int. Cl.
*F03B 13/00* (2006.01)
*F03B 13/18* (2006.01)

(52) U.S. Cl.
CPC .. *F03B 13/1865* (2013.01); *F05B 2220/7068* (2013.01)

(58) Field of Classification Search
CPC ............... F03B 13/1865; F05B 2220/7068
USPC ................................................... 290/42, 53
See application file for complete search history.

(56) References Cited

U.S. PATENT DOCUMENTS

| | | | |
|---|---|---|---|
| 2008/0309088 A1* | 12/2008 | Agamloh | H02K 7/1876 290/53 |
| 2011/0012358 A1* | 1/2011 | Brewster | F03B 13/20 310/11 |
| 2016/0252071 A1* | 9/2016 | Phillips | H02M 7/066 290/50 |
| 2016/0319798 A1* | 11/2016 | Blodgett | H02K 7/1853 |

FOREIGN PATENT DOCUMENTS

CN    101737239 A  *  6/2010

* cited by examiner

*Primary Examiner* — Julio C. Gonzalez
(74) *Attorney, Agent, or Firm* — Barry Choobin; Patent 360

(57) ABSTRACT

A float apparatus for harnessing the kinetic energy of waves. The float apparatus includes a float having a central vertical tunnel. An elongated housing is disposed within the tunnel, the housing has a closed top and an open bottom. A wire coil is disposed within the housing. A bar magnet is received within the housing and the wire coil, wherein the movement of the bar magnet relative to the wire coil within the housing results in generation of current in the wire coils. A ballast that submerges in water is suspended from the float body by multiple elastic cords. A shaft extends between the bar magnet and the ballast. The movement of the float body relative to the ballast by waves causes the magnet to move relative to the wire coils generating electricity.

13 Claims, 3 Drawing Sheets

FLOAT APPARATUS FOR HARNESSING WAVE ENERGY

CROSS-REFERENCE TO RELATED APPLICATIONS

This application claims priority from a U.S. provisional patent application Ser. No. 63/511,510, filed on Jun. 30, 2023, which is incorporated herein by reference in its entirety.

FIELD OF INVENTION

The present invention relates to a float apparatus and more particularly, the present invention relates to a float apparatus for generating electricity from wave energy.

BACKGROUND

Renewable energy, also referred to as clean energy, is generated from natural sources, such as sunlight, tidal, wind, and nuclear. Worldwide, countries are switching to renewable energy from hydrocarbon-based energy. This is due to a wide variety of reasons, such as environmental impacts, reduction in the import of fuels, and the like. Governments in many countries are providing incentives for the adoption of renewable energy.

Clean energy can be generated from a variety of natural sources depending upon availability. There is a great interest in harnessing the kinetic energy of waves and other latent motions of bodies of water. The known apparatuses for harnessing the kinetic energy of waves are typically complex in design and bulky to install. The overall costs of installing the known apparatuses are also high.

Thus, a need is appreciated for a novel apparatus for harnessing the kinetic energy of waves and other water movement that overcomes the drawbacks and limitations of existing wave energy harnessing apparatuses that are costly and require the transmission of kinetic energy through multiple mechanisms.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a float apparatus for harnessing the kinetic energy of waves.

It is another object of the present invention that the float apparatus is compact and easy to install.

It is still another object of the present invention that the float apparatus is economical to manufacture.

It is yet another object of the present invention that the float apparatus has good efficiency.

In one aspect, disclosed is a float apparatus for harnessing kinetic energy of waves, the float apparatus comprises a float body, the float body has a central tunnel that extends vertically, the central tunnel is at least open at a bottom thereof, the float body is configured to remain afloat in water; an elongated housing disposed within the tunnel, the elongated housing has a closed top and an open bottom; a wire coil disposed within the housing, a bar magnet received within the housing and the wire coil, wherein the bar magnet is configured to freely pass through the wire coil, wherein movement of the bar magnet relative to the wire coil results in generation of current within the wire coils; a shaft having a proximal end and a distal end, the proximal end is coupled to the bar magnet, and the shaft extends from the open bottom of the housing; and a ballast, configured to be submerged in water, the distal end of the shaft is coupled to the ballast, the ballast suspends from the float body by a plurality of elastic cords.

In one aspect, the plurality of elastic cords comprises at least three elastic cords. Rach of the plurality elastic cords comprises one or more springs. The ballast comprises a hollow body, the hollow body has a plurality of holes in a top thereof, wherein water fills into the hollow body through these holes. The bar magnet is a permanent magnet. The float apparatus further comprises a spring disposed within the housing at the closed top. The open bottom of the housing is sealed around the shaft. The float body has a plurality of first hooks disposed around an outer periphery thereof. The ballast comprises a plurality of second hooks disposed around an outer periphery thereof, the plurality of first hooks and the plurality of second hooks are for the plurality of elastic cords.

In one aspect, disclosed is a method for generating electricity from kinetic energy of waves, the method comprises providing a float apparatus for harnessing kinetic energy of waves. The float apparatus comprises a float body, the float body has a central tunnel that extends vertically, the central tunnel is at least open at a bottom thereof, the float body is configured to remain afloat in water, an elongated housing disposed within the tunnel, the elongated housing has a closed top and an open bottom, a wire coil disposed within the housing, a bar magnet received within the housing and the wire coil, wherein the bar magnet is configured to freely pass through the wire coil, wherein movement of the bar magnet relative to the wire coil results in generation of current within the wire coils, a shaft having a proximal end and a distal end, the proximal end is coupled to the bar magnet, and the shaft extends from the open bottom of the housing, and a ballast, configured to be submerged in water, the distal end of the shaft is configured to couple to the ballast, the ballast is configured to be suspended from the float body by a plurality of elastic cords. The method further comprises coupling the distal end of the shaft with the ballast; and suspending the ballast from the float body in water.

BRIEF DESCRIPTION OF DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
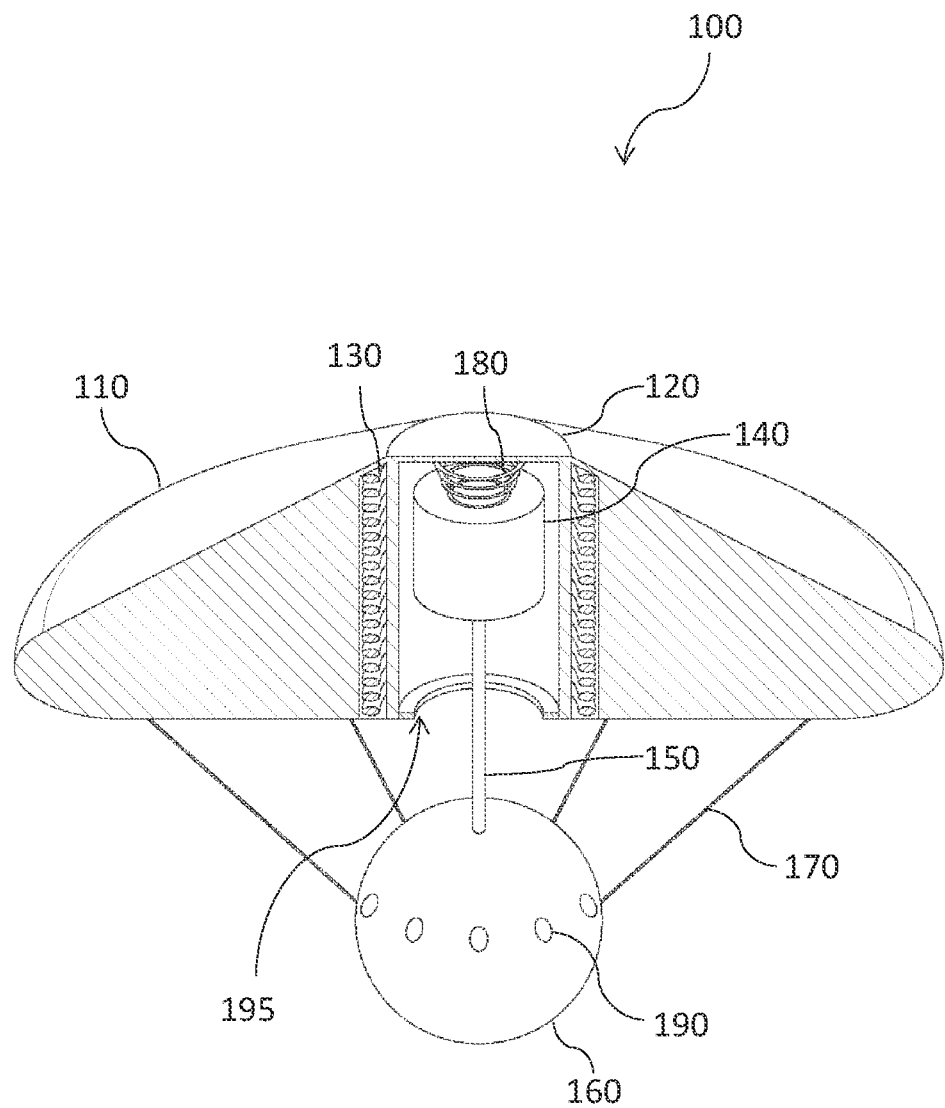
FIG. 1 shows a perspective view of a float apparatus in which a float is shown in a partial cutout view to show the internal components, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Disclosed is a float apparatus for harnessing the kinetic energy of waves. The disclosed float apparatus is easy to install and economical to manufacture. Thus, electricity can be generated at low cost and more efficiently. The disclosed apparatus can be installed in lakes, streams, oceans, seas, and the like water bodies.

Referring to the drawing which illustrates a schematic diagram showing the disclosed float apparatus. The float apparatus 100 includes a float body 110 of a large size that is buoyant enough to remain afloat in water. The float body 110 shown in the drawings is round, however, the float body of any other shape is within the scope of the present invention. The float body has a central tunnel that extends vertically and opens at the top and bottom of the float body. A cylindrical housing 120 is disposed within the tunnel, wherein the cylindrical housing extends vertically upwards, downwards, and/or throughout the tunnel. A wire coil 130 is disposed within the cylindrical housing or a portion of the cylindrical housing. The wire coil can be disposed in a top and middle portion of the cylindrical housing. The wire coil can be disposed throughout the cylindrical housing as well.

The wire coil can have multiple turns for the generation of electricity, and the number of turns can be varied without departing from the scope of the present invention. For example, the number of turns can be optimized based on other components and the installation environment.

The apparatus further includes a permanent magnet 140 that is coupled at one end to a shaft 150. The permanent magnetic can be of a cylindrical bar shape. The wire coil can be such that the cylindrical bar magnet can freely pass through. The bar magnet is slidably received within the cylindrical housing having the shaft at the bottom thereof. The bar magnet can move freely inside the cylindrical housing and through the wire coil. The top of the cylindrical housing can be closed. The cylindrical housing can have an open bottom so that at least the shaft can pass through it freely. The bottom opening 195 of the cylindrical housing can be sealed around the shaft, such that the shaft can freely slide through the bottom opening, but water or air cannot ingress into the housing that may otherwise damage the coil or magnet, or any other components encased within the housing.

Figure 3:
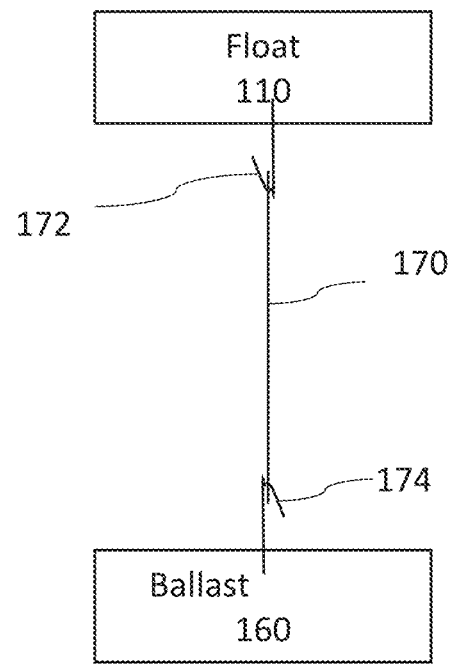
FIG. 3 shows hooks of the float and ballast.
Figure 4:
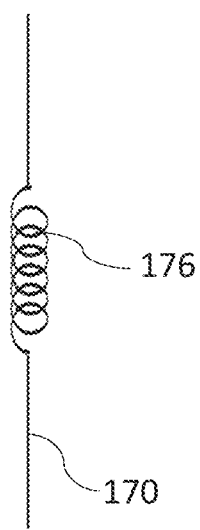
FIG. 4 shows the spring incorporated in line attaching the float and ballast.

The proximal end of the shaft is coupled to the magnet and the distal end of the shaft is coupled to a ballast 160. The ballast can submerge in water, wherein the weight of the ballast is such that the float body remains afloat in water. The ballast is suspended from the float body through elastic cords 170. The elastic cords can be springs or stretchable cords that can stretch up to a certain length. Also, rigid poles or flexible codes provided with springs 176 (shown in FIG. 4) can be used to suspend the ballast from the float body. The float along its outer periphery can have hooks 172 (shown in FIG. 3) and the stretchable cords can be coupled to these hooks. Similarly, the outer periphery of the ballast can be provided with hooks 174, and the free ends of the stretchable cords can be coupled to these hooks of the ballast for suspending the same in water. In the still or calm waters, the magnet can remain positioned in the top portion of the cylindrical housing. In waves or turbulent waters, the kinetic energy of the waves may cause the float body to move upwards relative to the ballast. Thus, the distance between the float body and the ballast increases and decreases with the turbulence in water. This causes the magnet to reciprocate within the cylindrical housing relative to the wire coil. This movement of the magnet, caused by the kinetic energy of waves, within the wire coils results in the generation of electricity.

Within the housing, at the top end, can be a recoil spring 180, that is positioned such that the magnet while moving up hits the recoil spring. The recoil spring can push back the magnet increasing the reciprocating movement of the magnet within the cylindrical housing, thus increasing the efficiency significantly. It is understood, however, that the recoil spring at the top of the cylindrical housing can be replaced by any suitable recoiling mechanism known to a skilled person, and any such recoil mechanism is within the scope of the present invention.

In certain implementations, the ballast can be a hollow body with holes 190 at the top thereof through which water can fill into the ballast. When submerged in water, the water enters through these holes and fills the ballast. The ballast is shown in the drawings as having a spherical shape, however, the ballast of any other shape, such as polygonal, cuboid, and the like is within the scope of the present invention. The ballast can be made from any suitable materials, preferably water-resistant and weather resistant. The ballast can be made rigid or flexible, and any such variation is within the scope of the present invention. For example, the ballast can be in the form of a bag that can be filled with water. Portions of such a bag can be rigid, wherein the rigid portion can have holes and is coupled to the shaft. Ballast can be made from metals, plastic, rubber, and the like. It is understood that the ballast can be filled with any other suitable material, instead of water, such as sand. The ballast filled with any such material is within the scope of the present invention.

In certain implementations, the wire coil can be connected through suitable leads to energy storage or load. The generated electricity can be stored, for example, in batteries. The generated energy can also be directly transferred to a grid through electrical wires. The generated electricity can also be supplied directly to a load.

The above embodiment describes the magnet as a cylindrical bar; however, the shape of the magnet can vary without departing from the scope of the present invention. For example, the magnet bar can be polygonal, cuboid, and of any other suitable shapes. The magnet can be a permanent magnet, or any other types of magnets known to a skilled person for use in electricity generators.

Cylindrical housing can be made in any other shape, such as square, rectangular, polygonal, and the like, and any such variations in the shape of housing are within the scope of the present invention. Moreover, the length and position of the housing can be varied without departing from the scope of the present invention. For example, the float body can have an elongated tunnel that extends up to near the top of the float body, and the tunnel is only open at the bottom of the float body. The cylindrical housing can fit within this tunnel. The housing may or may not extend further from the bottom of the float body. Also, in case of hollow tunnel, the housing can extend further upwards from the top of the float body and downwards further from the bottom of the float body. Thus, the length of the housing relative to the tunnel in the float body can vary without departing from the scope of the present invention.

In certain implementations, the apparatus may further include a tension adjusting mechanism for the stretchable cords. The tension adjusting mechanism can allow adjusting the length of the elastic cords.

Figure 2:
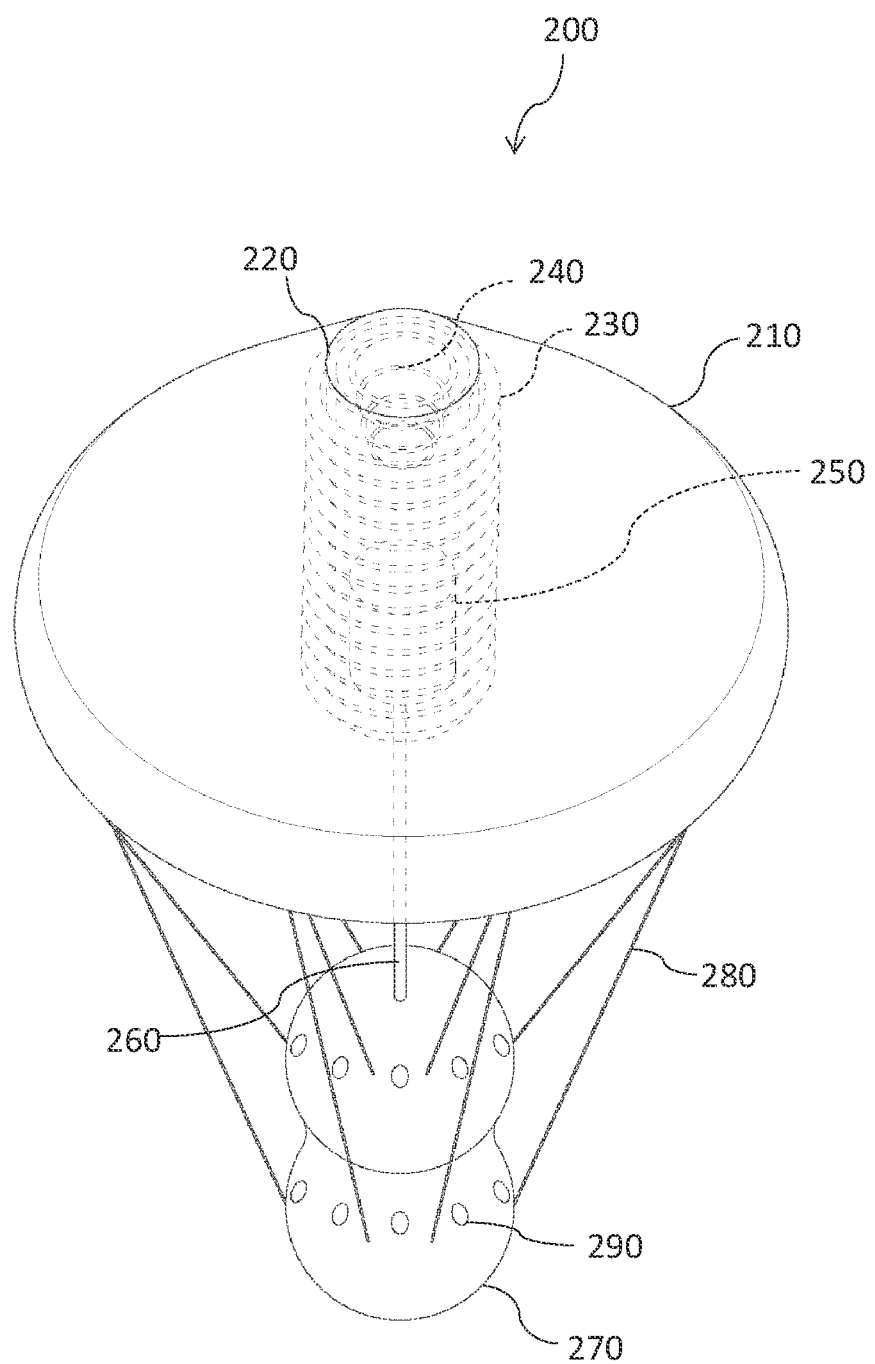
FIG. 2 shows a perspective view of the float apparatus in which a different embodiment of a ballast is used, according to an exemplary embodiment of the present invention.

Referring to FIG. 2 which show an exemplary embodiment of the disclosed float apparatus 200. The float apparatus 200 includes a float body 210, a cylindrical housing 220 fitted with a central tunnel in the float body, coils 230 disposed in the cylindrical housing, a spring 240 at closed top of the cylindrical housing, a bar magnet 250 disposed within the cylindrical housing, bottom of the bar magnet coupled to a shaft 260, the shat connected to a double ballast 270 through elastic cords 280, and the ballast having holes 290 through a top portion thereof.

In certain implementation, the shaft connecting the magnetic bar to the ballast can be a hollow tube. The hollow tube at one end can open into an interior volume of the ballast and the other open end can open in the housing i.e., in the top of the magnet bar. The open end of the hollow tube opening in the housing can have a check valve to ensure that the air can only travel down into the ballast. When the ballast rises it will force air down the tube and displace the water in the ballast which will make it rise quicker.

It is to be noted that the specification describes the use of disclosed apparatus for harnessing the energy from ocean waves, however, it is obvious that the disclosed float apparatus can be used in any water body or liquid for harnessing energy from any kind of latent motion in the water body or liquid.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A float apparatus for harnessing kinetic energy of waves, the float apparatus comprises:
   a float body, the float body has a central tunnel that extends vertically, the central tunnel has at least an opening at a bottom thereof, the float body is configured to remain afloat in water;
   an elongate housing disposed within the central tunnel, the elongate housing has a closed top and an open bottom;
   a wire coil disposed within the elongate housing,
   a bar magnet received within the elongate housing and the wire coil, wherein the bar magnet is configured to freely reciprocate within elongate housing, wherein movement of the bar magnet relative to the wire coil results in generation of current within the wire coil;
   a shaft having a proximal end and a distal end, the proximal end is coupled to the bar magnet, and the shaft extends from the bottom opening of the elongate housing; and
   a ballast, configured to be submerged in water, the distal end of the shaft is coupled to the ballast, the ballast is suspended from the float body by a plurality of elastic cords, wherein the ballast comprises a hollow body, the hollow body has a plurality of holes in a top thereof, wherein water fills into the hollow body through the plurality of holes.

2. The float apparatus according to claim 1, wherein the plurality of elastic cords comprises at least three elastic cords.

3. The float apparatus according to claim 1, wherein each of the plurality of elastic cords comprises one or more springs.

4. The float apparatus according to claim 1, wherein the bar magnet is a permanent magnet.

5. The float apparatus according to claim 1, wherein the float apparatus further comprises a spring disposed within the elongate housing at the closed top.

6. The float apparatus according to claim 1, wherein the open bottom of the elongate housing is sealed around the shaft.

7. The float apparatus according to claim 1, where the float body has a plurality of first hooks disposed around an outer periphery thereof.

8. The float apparatus according to claim 7, wherein the ballast comprises a plurality of second hooks disposed around an outer periphery thereof, the plurality of first hooks and the plurality of second hooks are for the plurality of elastic cords.

9. The float apparatus according to claim 1, wherein the shaft is a hollow tube, wherein a first open end of the hollow tube opens in the elongate housing and a second open end of the elongate housing opens in the ballast, wherein the first open end is interrupted by a check valve configured to allow air to move down to the ballast.

10. The float apparatus according to claim 1, wherein the ballast is flexible having rigid portions, wherein the holes are in the rigid portions.

11. A method for generating electricity from kinetic energy of waves, the method comprises:
    providing a float apparatus for harnessing kinetic energy of waves, the float apparatus comprises:
        a float body, the float body has a central tunnel that extends vertically, the central tunnel is at least open at a bottom thereof, the float body is configured to remain afloat in water,
        an elongate housing disposed within the central tunnel, the elongate housing has a closed top and an opening at a bottom,
        a wire coil disposed within the elongate housing,
        a bar magnet received within the elongate housing and the wire coil, wherein the bar magnet is configured to reciprocate up and down with in the elongate housing, wherein movement of the bar magnet relative to the wire coil results in generation of current within the wire coil,
        a shaft having a proximal end and a distal end, the proximal end is coupled to the bar magnet, and the shaft extends from the bottom opening of the elongate housing, and
        a ballast configured to be submerged in water, the distal end of the shaft is configured to be couple to the ballast, the ballast is configured to be suspended from the float body by a plurality of elastic cords, wherein the ballast comprises a hollow body, the hollow body has a plurality of holes in a top thereof, wherein water fills into the hollow body through the plurality of holes;
    coupling the distal end of the shaft with the ballast;
    fastening the plurality of elastic cords between the float body and the ballast; and
    suspending the ballast in water, wherein the float body remains afloat in water.

12. The method according to claim 11, wherein the shaft is a hollow tube, wherein a first open end of the hollow tube opens in the elongate housing and a second open end of the elongate housing opens in the ballast, wherein the first open end is interrupted by a check valve configured to allow air to move down to the ballast.

13. The method of claim 11, wherein each of the plurality of elastic cords comprises one or more springs.

* * * * *